(12) United States Patent
Guan et al.

(10) Patent No.: US 10,697,604 B2
(45) Date of Patent: Jun. 30, 2020

(54) VEHICLE LAMP

(71) Applicant: Hua Xin Optronics Co., Hsinchu (TW)

(72) Inventors: You-Kang Guan, Sanwan Township (TW); I-Liang Huang, Hsinchu (TW)

(73) Assignee: Hua Xin Optronics Co., Hsinchu (TW)

(*) Notice: Subject to any disclaimer, the term of this patent is extended or adjusted under 35 U.S.C. 154(b) by 0 days.

(21) Appl. No.: 16/263,170

(22) Filed: Jan. 31, 2019

(65) Prior Publication Data

US 2019/0242543 A1 Aug. 8, 2019

(30) Foreign Application Priority Data

Feb. 8, 2018 (TW) .............................. 107104534 A

(51) Int. Cl.
*F21S 41/275* (2018.01)
*F21S 41/255* (2018.01)
*F21S 41/32* (2018.01)
*F21S 41/40* (2018.01)
*F21S 45/48* (2018.01)
*B60Q 1/04* (2006.01)
*F21S 41/147* (2018.01)
*F21S 41/43* (2018.01)
*F21S 41/148* (2018.01)
*F21S 41/365* (2018.01)
*F21S 45/47* (2018.01)

(52) U.S. Cl.
CPC .............. *F21S 41/275* (2018.01); *B60Q 1/04* (2013.01); *F21S 41/147* (2018.01); *F21S 41/148* (2018.01); *F21S 41/255* (2018.01); *F21S 41/32* (2018.01); *F21S 41/321* (2018.01); *F21S 41/365* (2018.01); *F21S 41/40* (2018.01); *F21S 41/43* (2018.01); *F21S 45/47* (2018.01); *F21S 45/48* (2018.01)

(58) Field of Classification Search
CPC .............................................. F21S 41/25–275
USPC ......................................................... 362/538
See application file for complete search history.

(56) References Cited

U.S. PATENT DOCUMENTS 7,736,036 B2 6/2010 Tatsukawa
2009/0257240 A1* 10/2009 Koike .................... F21S 41/275
362/538

(Continued)

FOREIGN PATENT DOCUMENTS

TW 201732194 A 9/2017

OTHER PUBLICATIONS

Search Report appended to an Office Action, which was issued to Taiwanese counterpart application No. 107104534 by the TIPO dated Jul. 17, 2018, with an English translation thereof.

*Primary Examiner* — Sean P Gramling
(74) *Attorney, Agent, or Firm* — Burris Law, PLLC

(57) ABSTRACT

A vehicle lamp for installing on a vehicle includes a projector lens, a reflector, a first light emitting element, a shield, and an optical grating unit. The projector lens has a light entry surface and a light exit surface. The first light emitting element is adjacent to a first focal point of the reflector, and is for emitting light towards the reflector. The shield is for blocking a portion of the light that is emitted from the first light emitting element to form a cut-off line in a light distribution pattern. The optical grating unit is for reflecting at least a portion of the light that has passed a second focal point of the reflector and that has not passed through the light exit surface of the projector lens.

15 Claims, 10 Drawing Sheets

(56) References Cited

U.S. PATENT DOCUMENTS

2009/0303741 A1* 12/2009 Shih ................ F21S 41/17
                                                      362/539
2012/0262935 A1    10/2012 Yamamoto

* cited by examiner

VEHICLE LAMP

CROSS-REFERENCE TO RELATED APPLICATION

This application claims priority of Taiwanese Patent Application No. 107104534, filed on Feb. 8, 2018.

FIELD

The disclosure relates to a lamp, more particularly to a vehicle lamp.

BACKGROUND

A conventional vehicle lamp is disclosed in U.S. Pat. No. 7,736,036. FIGS. 2 and 5 of U.S. Pat. No. 7,736,036 are referred to in the following description.

The conventional vehicle lamp includes a projector lens 12, a light emitting element 14, and a reflector 16. The projector lens 12 defines an optical axis (Ax) extending in a front-rear direction, and includes front and rear side surfaces 12a, 12b spaced apart along the optical axis (Ax). The light emitting element 14 is proximal to a rear focal point (F) of the projector lens 12. The reflector 16 reflects light from the light emitting element 14. The front side surface 12a is formed with a plurality of lens elements 12As, 12Bs extending substantially in a horizontal direction and spaced apart vertically. An external surface of each of the lens elements 12As, 12Bs has a waveform shape. A light distribution pattern formed by the light which radiates from the conventional vehicle lamp has a cutoff line.

The lens elements 12As, 12Bs are for diffracting light emitted by the light emitting element 14 when the light passes through the projector lens 12 such that light is diffracted to above the cutoff line, reducing discomfort for drivers in an oncoming vehicle.

However, the positions and angles of the lens elements 12As, 12Bs must be precisely controlled so that the diffracted light converge, otherwise the light may be over-diffracted, leading to an increase in brightness above the cutoff line or a decrease in brightness below the cutoff line, causing discomfort to the oncoming driver or producing insufficient lighting for the driver of the vehicle.

SUMMARY

Therefore, the object of the disclosure is to provide a vehicle lamp that can alleviate at least one of the drawbacks of the prior art.

According to the disclosure, a vehicle lamp is adapted to be installed on a vehicle, and includes a projector lens, a reflector, a first light emitting element, a shield, and an optical grating unit.

The projector lens is disposed on an optical axis which extends along a longitudinal direction of the vehicle, and has a light entry surface and a light exit surface that is opposite to the light entry surface.

The reflector is disposed on the optical axis at a position which is behind a rear focal point of the projector lens.

The first light emitting element is disposed for emitting light towards the reflector, such that the light is reflected by the reflector to pass a second focal point of the reflector which is proximate to the rear focal point of the projector lens, and to pass subsequently through the light entry surface and the light exit surface of the projector lens to form a light distribution pattern. The first light emitting element is adjacent to a first focal point of the reflector which is distal from the rear focal point of the projector lens.

The shield is for blocking a portion of the light that is emitted from the first light emitting element to form a cut-off line in the light distribution pattern.

The optical grating unit is disposed below the optical axis, and disposed between the rear focal point of the projector lens and the projector lens for reflecting at least a portion of the light that has passed the second focal point of the reflector and that has not passed through the light exit surface of the projector lens.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
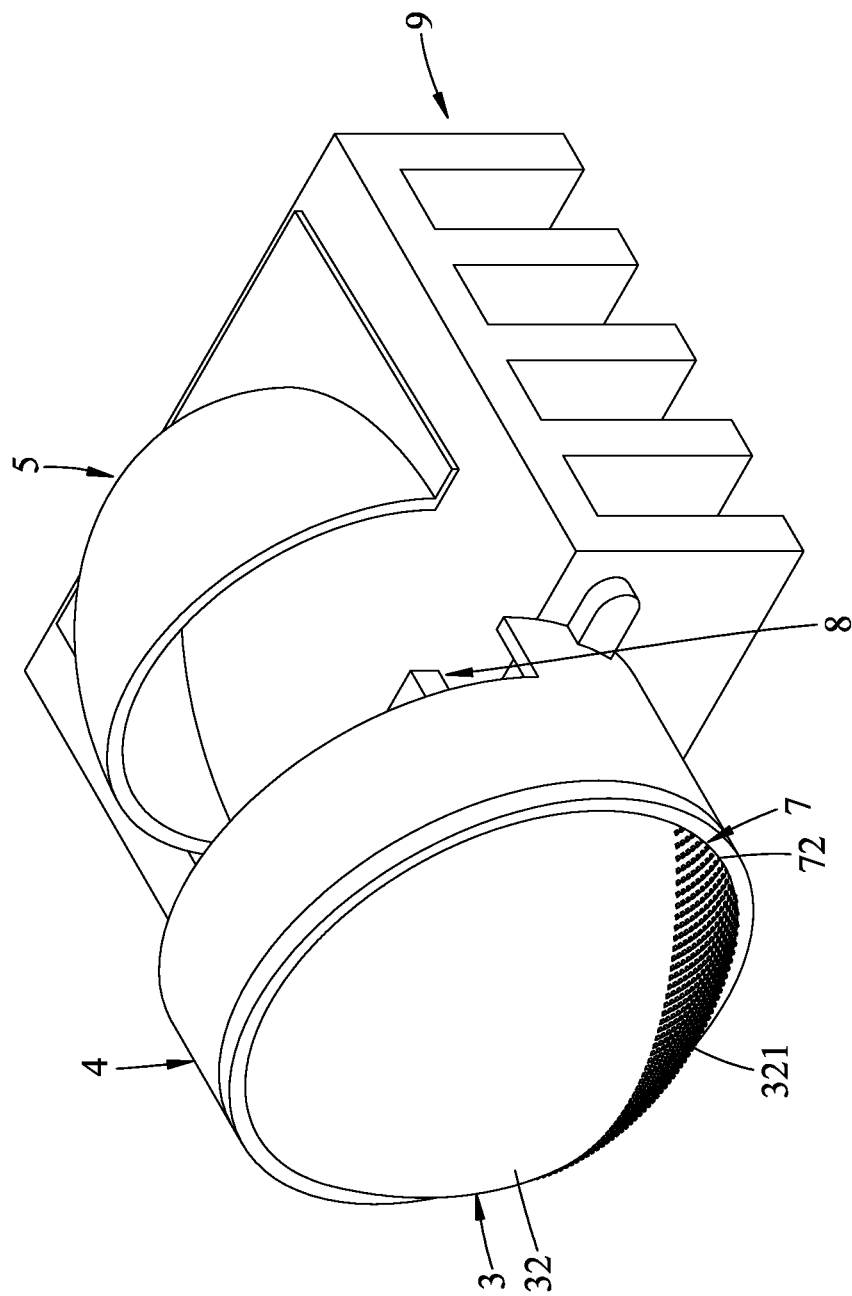
FIG. 1 is a perspective view of a first embodiment of a vehicle lamp according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
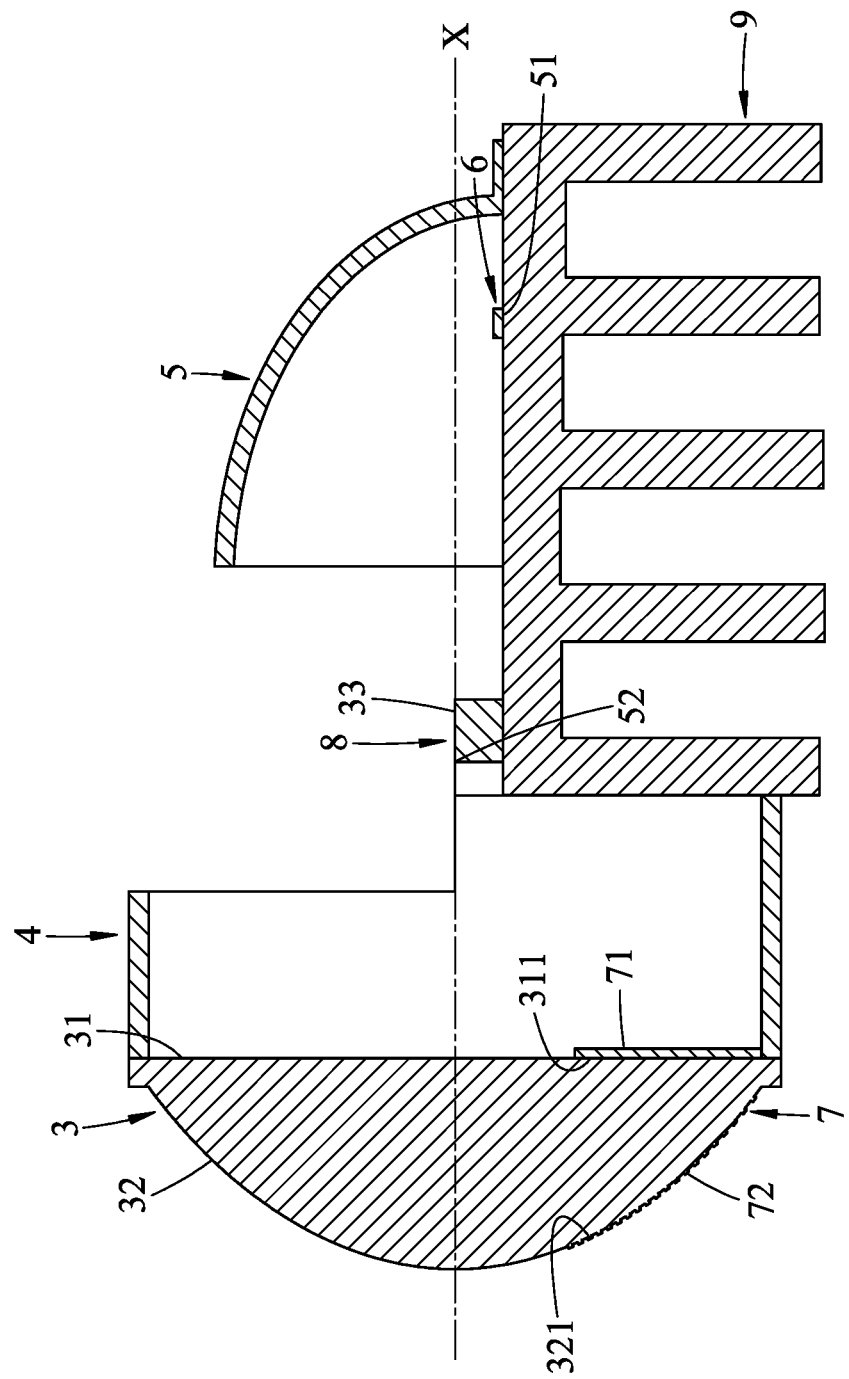
FIG. 2 is a sectional view of the first embodiment.

Referring to FIGS. 1 and 2, a first embodiment of a vehicle lamp is adapted to be installed on a vehicle (not shown). The vehicle lamp includes a projector lens 3, a lens holder 4, a reflector 5, a first light emitting element 6, an optical grating unit 7, a front thin film 72, a shield 8, and a heat dissipating member 9.

The projector lens 3 is disposed on an optical axis (X) which extends along a longitudinal direction of the vehicle, and has a light entry surface 31 and a light exit surface 32 that is opposite to the light entry surface 31. The light entry surface 31 has a rear reflecting region 311 that is disposed below and spaced apart from the optical axis (X). The light exit surface 32 has a front reflecting region 321 that is disposed below and spaced apart from the optical axis (X).

In this embodiment, the projector lens 3 is a plano-convex lens. In variations of this embodiment, the projector lens 3 may be any lens that has a positive refractive index, e.g. a biconvex lens.

The lens holder 4 is for supporting and securing the projector lens 3.

The reflector 5 is disposed on the optical axis (X) at a position which is behind a rear focal point 33 of the projector lens 3.

The first light emitting element 6 is disposed for emitting light towards the reflector 5, such that the light is reflected by the reflector 5 to pass a second focal point 52 of the reflector 5 and to pass subsequently through the light entry surface 31 and the light exit surface 32 of the projector lens 3 to form a light distribution pattern. The first light emitting element 6 is adjacent to a first focal point 51 of the reflector 5 and disposed below the optical axis (X). In this embodiment, the first light emitting element 6 is disposed 5 to 10 millimeters below the optical axis (X). The first and second focal points 51, 52 are respectively distal from and proximate to the rear focal point 33 of the projector lens 3.

In this embodiment, the first light emitting element 6 is a light emitting diode constructed from at least one semiconductor chip.

The optical grating unit 7 is disposed below the optical axis (X), and disposed between the rear focal point 33 of the projector lens 3 and the projector lens 3. The optical grating unit 7 is for reflecting at least a portion of the light that has passed the second focal point 52 of the reflector 5 and that has not passed through the light exit surface 32 of the projector lens 3.

In the first embodiment, the optical grating unit 7 includes a rear thin film 71 disposed at the rear reflecting region 311, and the front thin film 72 is disposed at the front reflecting region 321.

Each of the front and rear thin films 71, 72 has a transmittance of smaller than or equal to 80% for visible light having wavelength between 400 and 700 nanometers, and has a thicknesses smaller than 10 millimeters.

Figure 3:
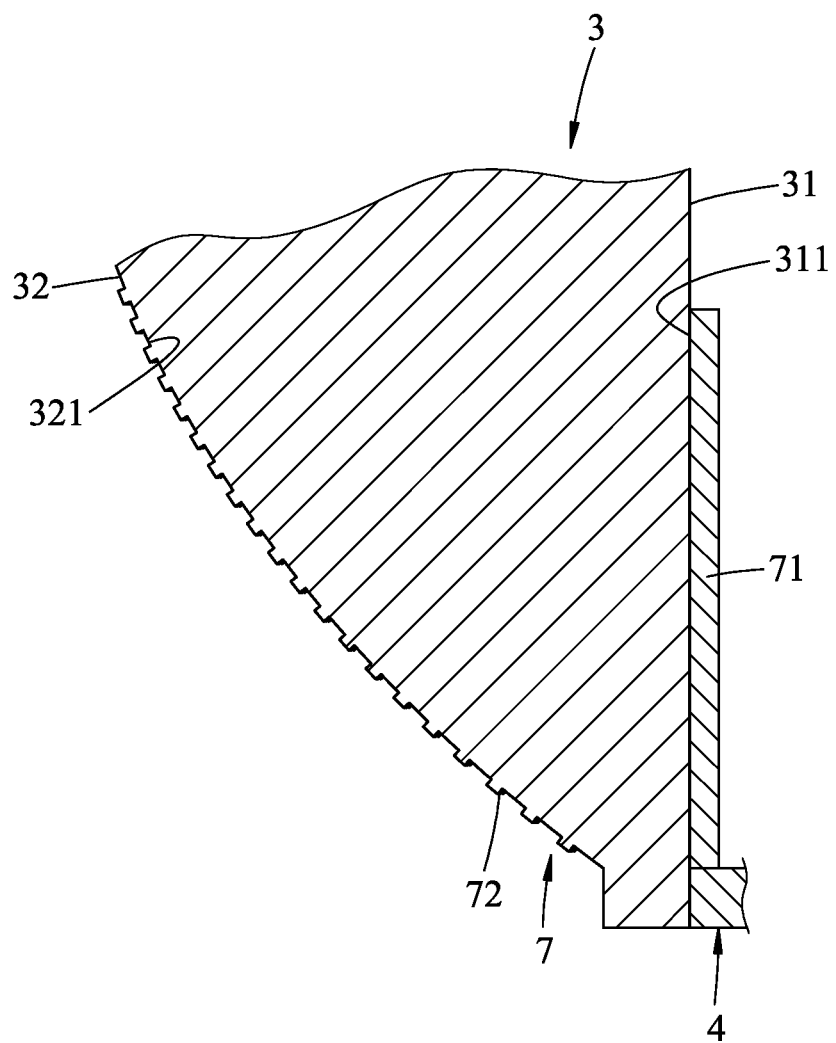
FIG. 3 is a magnified view of FIG. 2, illustrating front and rear thin films of the first embodiment.

Referring to FIGS. 2 and 3, in this embodiment, the rear thin film 71 is a coating, and the front thin film 72 is a microstructure. In variations of this embodiment, the rear thin film 71 may be a microstructure and the front thin film 72 may be a coating.

In this embodiment, the coating is made of aluminum, which adheres easily to the projector lens 3 and whose thickness may be controlled to vary the transmittance of the coating.

In this embodiment, the coating is formed using one of vapor disposition, sputtering disposition, and adhesive film, and each of the rear and front thin films 71, 72 may be either a single-layer film or a multi-layer film.

In this embodiment, the microstructure is formed using one of processing methods of sandblasting, grinding, laser, and etching, and may be formed directly on the projector lens 3 or using injection molding.

The shield 8 is for blocking a portion of the light that is emitted from the first light emitting element 6 to form a cut-off line in the light distribution pattern.

The heat dissipating member 9 is mounted with the lens holder 4, the reflector 5, the first light emitting element 6, and the shield 8.

Figure 4:
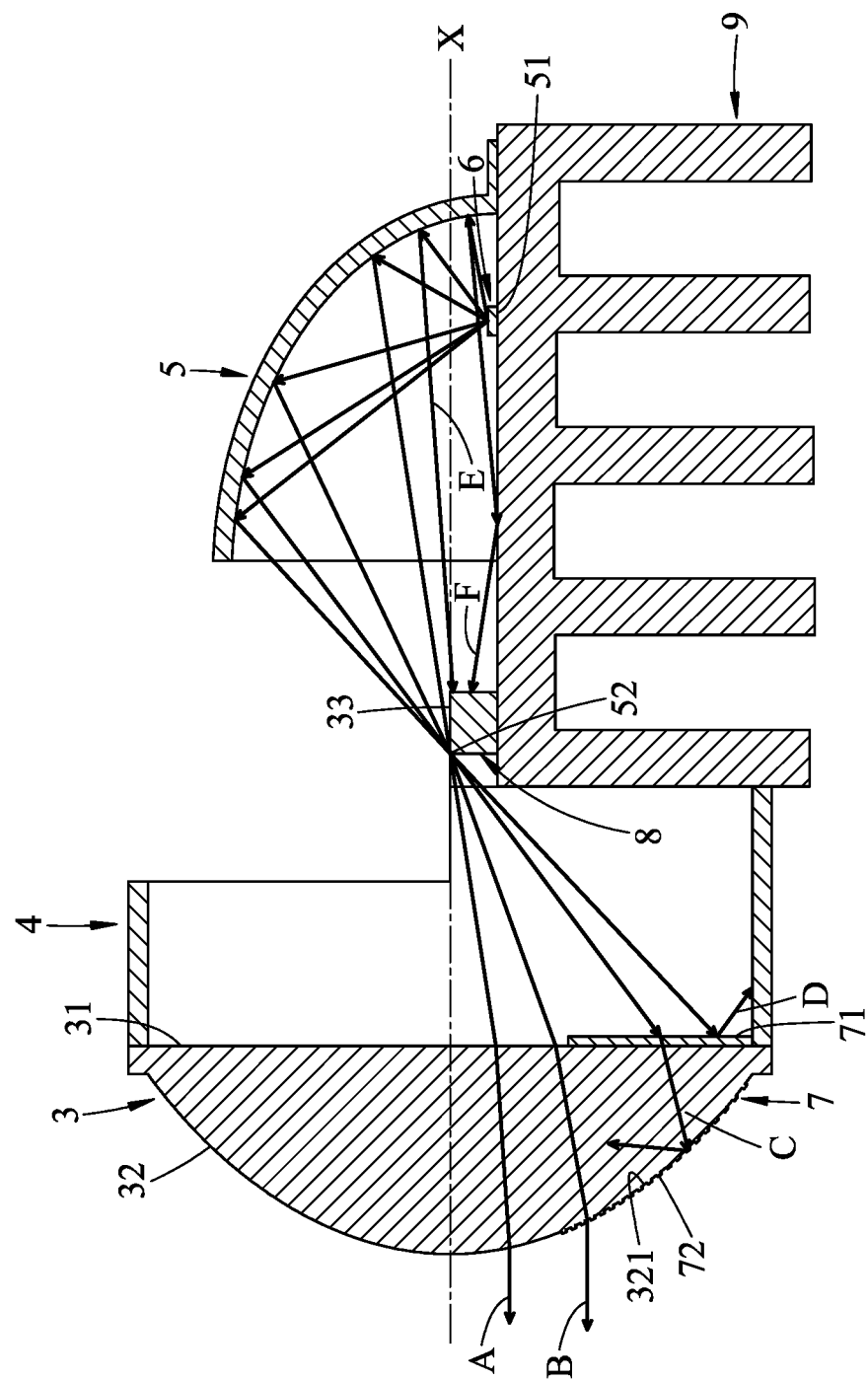
FIG. 4 is another sectional view of the first embodiment, illustrating representative light rays.

Referring to FIG. 4, the first light emitting element 6 emits a plurality of light rays. For ease of illustration, only six representative light rays (A, B, C, D, E and F) are shown.

The light rays (A, B, C, and D) are directed towards the light entry surface 31 after being reflected by the reflector 5. The light rays (A, B) both do not pass through the rear reflecting region 311. The light ray (A) passes through the light exit surface 32 after being refracted by the projector lens 3. The light rays (C, D) both reach the rear thin film 71, where light ray (D) is reflected by the rear thin film 71. The light rays (B, C) reach the front thin film 72, where the light ray (C) is reflected by the front thin film 72. The light ray (B) passes through the front thin film 72 and thus through the light exit surface 32.

The light ray (E) is directed towards and shielded by the shield 8 after being reflected by the reflector 5. The light ray (F) is reflected first by the reflector 5, then reflected by the heat dissipating member 9, and finally shielded by the shield 8. The light rays (E, F) being shielded by the shield 8 forms the cutoff line in the light distribution pattern.

Figure 5:
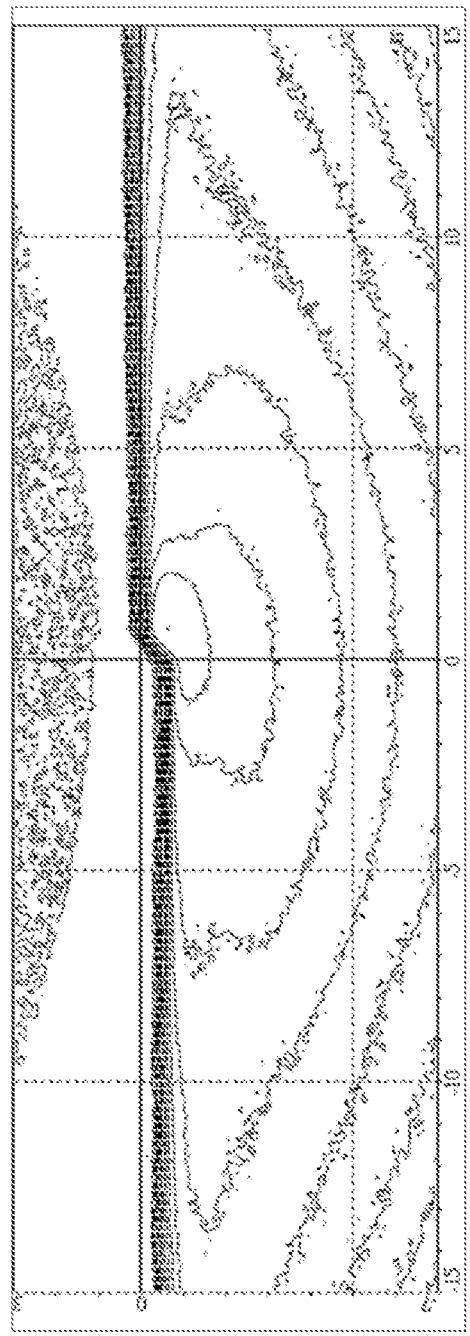
FIG. 5 is a light distribution pattern of a conventional vehicle lamp.
Figure 6:
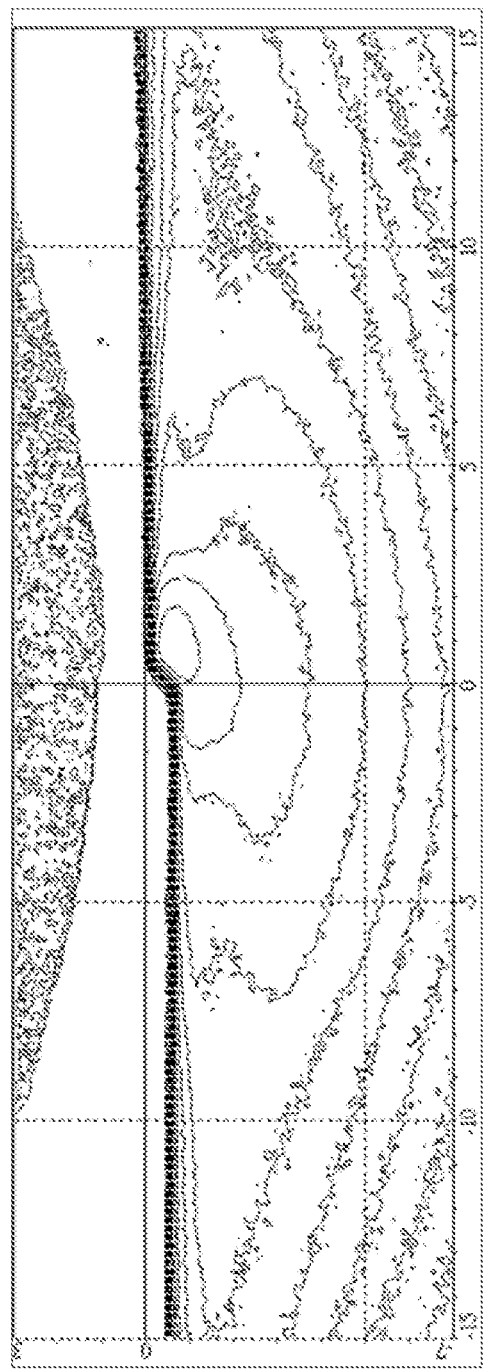
FIG. 6 is a light distribution pattern of the first embodiment.

A light distribution pattern of a conventional vehicle lamp without an optical grating unit 7 is shown in FIG. 5. In the regions proximal to the cutoff line, the light is more dispersed. A light distribution pattern of the first embodiment is shown in FIG. 6. As light rays (C, D) are reflected or blocked by the optical grating unit 7 and the front thin film 72 and do not radiate from the light exit surface 32, the light rays proximal to the cutoff line are more concentrated, which reduces effects of stray light and chromatic dispersion around the cutoff line.

Specifically, because the light rays (C, D) are reflected and the light rays (E, F) are shielded by the shield 8, reduction of photometric value is below 10% at two testing points for right-hand traffic 50 R and 50 V of Regulation No. 112 of the United Nations Economic Commission for Europe.

Figure 7:
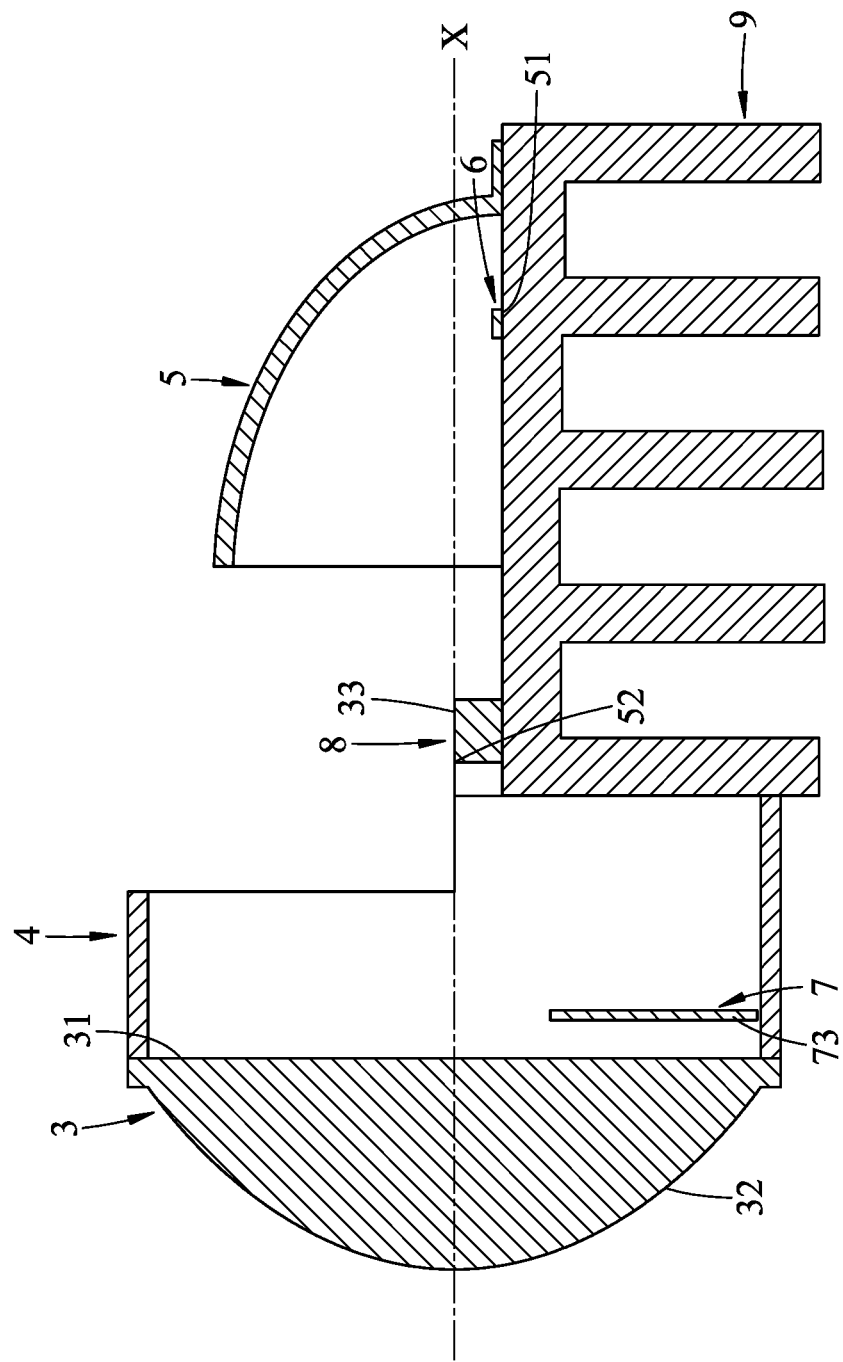
FIG. 7 is a sectional view of a second embodiment of a vehicle lamp according to the disclosure.

Referring to FIG. 7, a second embodiment of a vehicle lamp has a structure similar to the first embodiment, the difference residing in the optical grating unit 7. In the second embodiment, the optical grating unit 7 includes a reflecting plate 73 disposed between and spaced apart from the light entry surface 31 and the rear focal point 33 of the projector lens 3.

Figure 8:
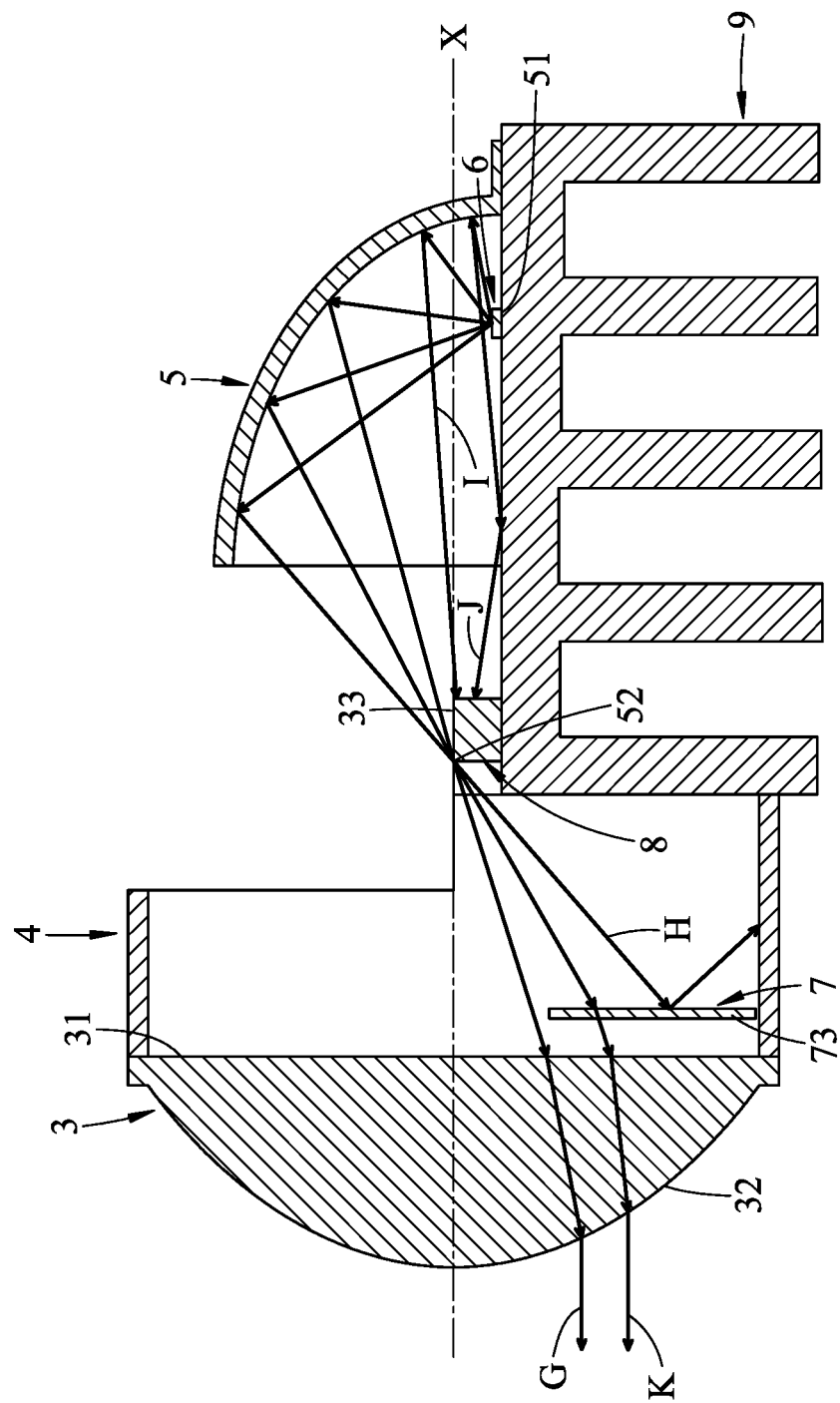
FIG. 8 is another sectional view of the second embodiment, illustrating representative light rays.

Referring to FIG. 8, the first light emitting element 6 emits a plurality of light rays. For ease of illustration, only five representative light rays (G, H, I, J, K) are shown. The light rays (G, H, K) are not shielded by the shield 8 after being reflected by the reflector 5. Light ray (G) passes through the light entry surface 31, is refracted by the projector lens 3 and exits through the light exit surface 32. The light ray (H) is directed towards the reflecting plate 73 after reflection by the reflector 5, and is also reflected by the reflecting plate 73.

The light ray (I) is directed towards and shielded by the shield 8 after being reflected by the reflector 5. The light ray (J) is first reflected by the reflector 5, then reflected by the heat dissipating member 9, and finally shielded by the shield 8. The light rays (E, F) being shielded by the shield 8 forms the cutoff line in the light distribution pattern.

By controlling the production of the reflecting plate 73, the reflecting plate 73 can be made to reflect a portion of the incident light (as represented by light ray (H)) and let a portion of the incident light (as represented by light ray (K)) pass through. As light ray (H) is reflected by the reflecting plate 73 and do not radiate from the light exit surface 32, the effects of stray light and chromatic dispersion around the cutoff line may be reduced similar to the first embodiment.

It should be noted that the front thin film 72 of the first embodiment may also be included in the second embodiment to cooperate with the reflecting plate 73 in reducing effects of stray light and chromatic dispersion around the cutoff line.

Figure 9:
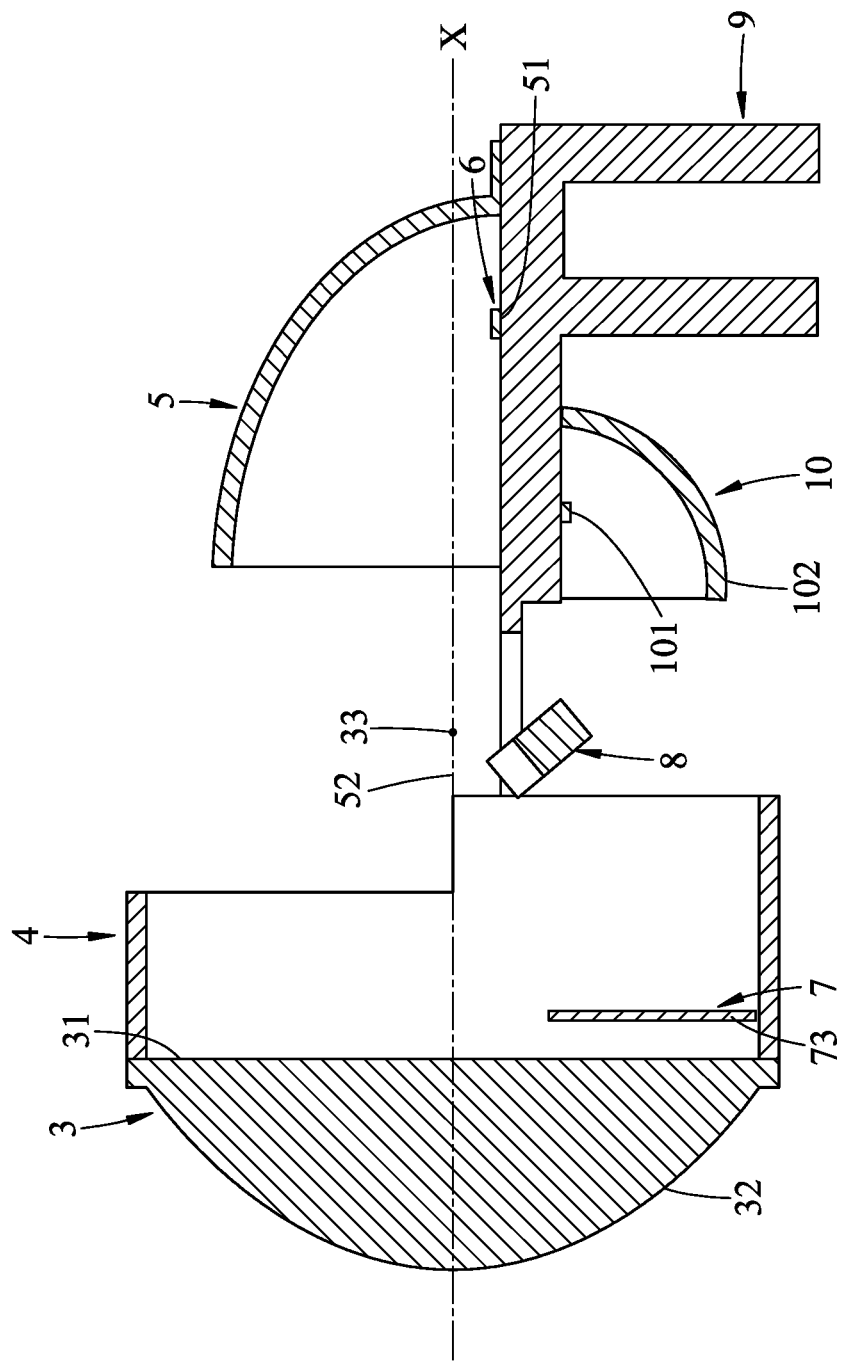
FIG. 9 is a sectional view of a third embodiment of a vehicle lamp according to the disclosure.
Figure 10:
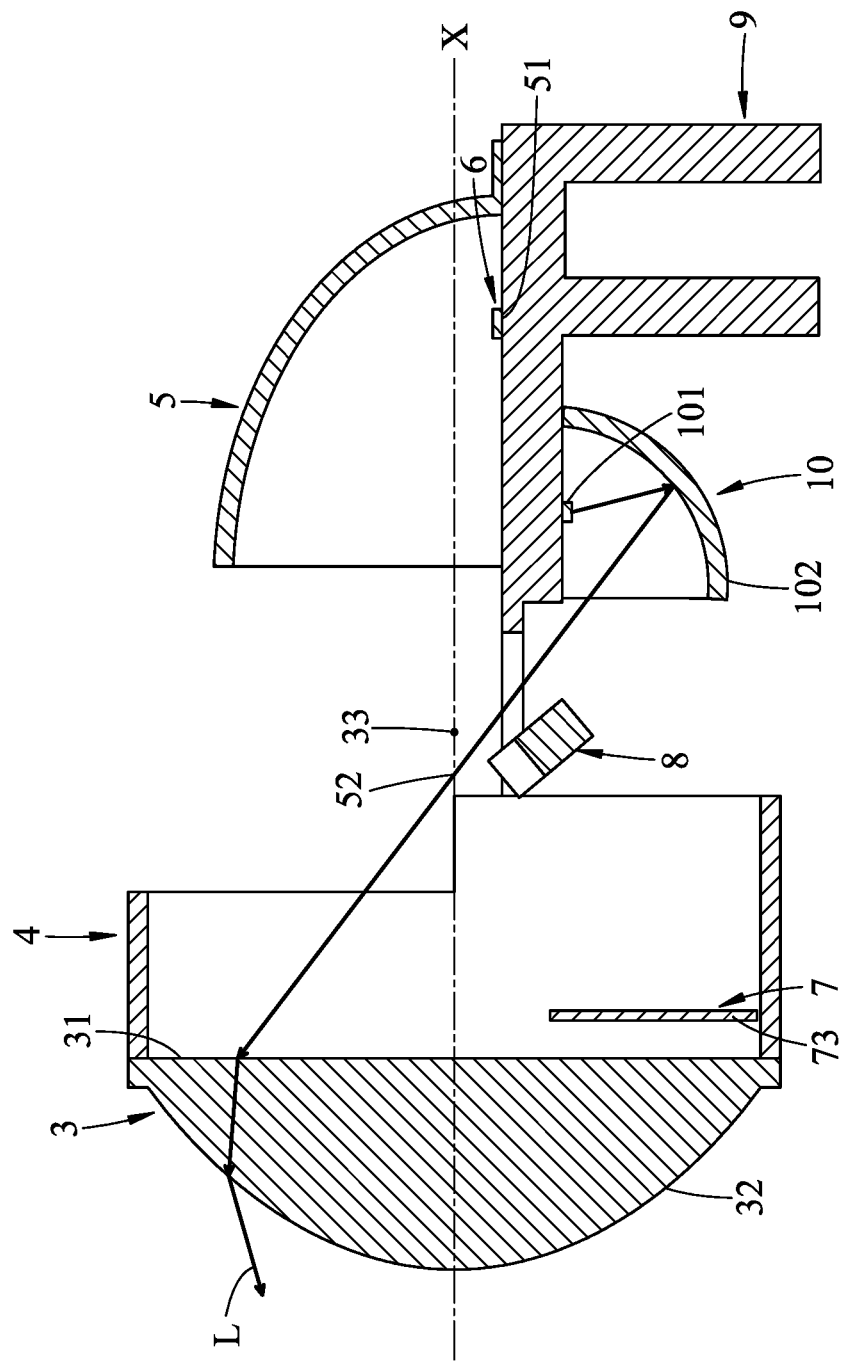
FIG. 10 is another sectional view of the third embodiment, illustrating a representative light ray.

Referring to FIGS. 9 and 10, a third embodiment of a vehicle lamp has a similar structure to the second embodiment, with the differences being that the vehicle lamp further includes a high beam unit 10 disposed below the optical axis (X).

The high beam unit 10 includes a second light emitting element 101 and a high beam reflector 102. Light emitted from the second light emitting element 101 is reflected by the high beam reflector 102 to pass at least one of two focal points of the high beam reflector 102 which are respectively proximate to the second light emitting element 101 and the rear focal point 33 of the projector lens 3.

Additionally, the shield 8 may be secured to the heat dissipating member 9 and operable to rotate, so that when the second light emitting element 101 is activated, the shield 8 may be turned an angle such that the light emitted by the second light emitting element 101 is not shielded.

Referring to FIG. 10, a light ray (L) represents the light emitted by the second light emitting element 101. The light ray (L) is first reflected by the high beam reflector 102, then refracted by the projector lens 3, exiting through the light exit surface 32. Thus, the light may reach further and provide longer range lighting for drivers in darker areas. The third embodiment shares the benefits of the second embodiment regarding the cutoff line.

It should be noted that the high beam member 10 and the rotatable shield 8 may also be included in the first embodiment. Further details are well known to those skilled in the art, and not described herein for the sake of brevity.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle lamp adapted to be installed on a vehicle, said vehicle lamp comprising:
    a projector lens disposed on an optical axis which extends along a longitudinal direction of the vehicle, and having a light entry surface and a light exit surface that is opposite to said light entry surface;
    a reflector disposed on the optical axis at a position which is behind a rear focal point of said projector lens;
    a first light emitting element disposed for emitting light towards said reflector, such that the light is reflected by said reflector to pass a second focal point of said reflector which is proximate to the rear focal point of said projector lens, and to pass subsequently through said light entry surface and said light exit surface of said projector lens to form a light distribution pattern, said first light emitting element being adjacent to a first focal point of said reflector which is distal from the rear focal point of said projector lens;
    a shield for blocking a portion of the light that is emitted from said first light emitting element to form a cut-off line in the light distribution pattern; and
    an optical grating unit disposed below the optical axis, and disposed between the rear focal point of said projector lens and said projector lens for reflecting at least a portion of the light that has passed the second focal point of said reflector and that has not passed through said light exit surface of said projector lens, wherein:
    said light entry surface has a rear reflecting region that is disposed below and spaced apart from the optical axis;
    said optical grating unit includes a rear thin film disposed at said rear reflecting region; and
    said rear thin film is a coating and is made of aluminum.

2. The vehicle lamp as claimed in claim 1, wherein said first light emitting element is disposed below the optical axis.

3. The vehicle lamp as claimed in claim 1, wherein said first light emitting element is a light emitting diode constructed from at least one semi-conductor chip.

4. The vehicle lamp as claimed in claim 1, further comprising a heat dissipating member mounted with said reflector, said first light emitting element and said shield.

5. The vehicle lamp as claimed in claim 1, further comprising a high beam unit disposed below the optical axis and including a second light emitting element and a high beam reflector, such that light emitted from said second light emitting element is reflected by said high beam reflector to pass at least one of two focal points of said high beam reflector which are respectively proximate to said second light emitting element and the rear focal point of said projector lens.

6. The vehicle lamp as claimed in claim 1, wherein said optical grating unit includes a reflecting plate disposed between and spaced apart from said light entry surface and said rear focal point of said projector lens.

7. The vehicle lamp as claimed in claim 6, further comprising a high beam unit disposed below the optical axis and including a second light emitting element and a high beam reflector, such that light emitted from said second light emitting element is reflected by said high beam reflector to pass at least one of two focal points of said high beam reflector which are respectively proximate to said second light emitting element and the rear focal point of said projector lens.

8. The vehicle lamp as claimed in claim 6, wherein:
    said light exit surface has a front reflecting region that is disposed below and spaced apart from the optical axis; and
    said vehicle lamp further comprises a front thin film disposed at said front reflecting region.

9. The vehicle lamp as claimed in claim 8, wherein said front thin film is a coating, and is made of aluminum.

10. The vehicle lamp as claimed in claim 1, wherein:
    said light exit surface has a front reflecting region that is disposed below and spaced apart from the optical axis; and
    said vehicle lamp further comprises a front thin film disposed at said front reflecting region.

11. The vehicle lamp as claimed in claim 10, wherein said front thin film is a coating, and is made of aluminum.

12. The vehicle lamp as claimed in claim 11, further comprising a high beam unit disposed below the optical axis and including a second light emitting element and a high beam reflector, such that light emitted from said second light emitting element is reflected by said high beam reflector to pass at least one of two focal points of said high beam reflector which are respectively proximate to said second light emitting element and the rear focal point of said projector lens.

13. A vehicle lamp adapted to be installed on a vehicle, said vehicle lamp comprising:
   a projector lens disposed on an optical axis which extends along a longitudinal direction of the vehicle, and having a light entry surface and a light exit surface that is opposite to said light entry surface;
   a reflector disposed on the optical axis at a position which is behind a rear focal point of said projector lens;
   a first light emitting element disposed for emitting light towards said reflector, such that the light is reflected by said reflector to pass a second focal point of said reflector which is proximate to the rear focal point of said projector lens, and to pass subsequently through said light entry surface and said light exit surface of said projector lens to form a light distribution pattern, said first light emitting element being adjacent to a first focal point of said reflector which is distal from the rear focal point of said projector lens;
   a shield for blocking a portion of the light that is emitted from said first light emitting element to form a cut-off line in the light distribution pattern;
   an optical grating unit disposed below the optical axis, and disposed between the rear focal point of said projector lens and said projector lens for reflecting at least a portion of the light that has passed the second focal point of said reflector and that has not passed through said light exit surface of said projector lens; and
   a high beam unit disposed below the optical axis and including a second light emitting element and a high beam reflector, such that light emitted from said second light emitting element is reflected by said high beam reflector to pass at least one of two focal points of said high beam reflector which are respectively proximate to said second light emitting element and the rear focal point of said projector lens.

14. A vehicle lamp adapted to be installed on a vehicle, said vehicle lamp comprising:
   a projector lens disposed on an optical axis which extends along a longitudinal direction of the vehicle, and having a light entry surface and a light exit surface that is opposite to said light entry surface;
   a reflector disposed on the optical axis at a position which is behind a rear focal point of said projector lens;
   a first light emitting element disposed for emitting light towards said reflector, such that the light is reflected by said reflector to pass a second focal point of said reflector which is proximate to the rear focal point of said projector lens, and to pass subsequently through said light entry surface and said light exit surface of said projector lens to form a light distribution pattern, said first light emitting element being adjacent to a first focal point of said reflector which is distal from the rear focal point of said projector lens;
   a shield for blocking a portion of the light that is emitted from said first light emitting element to form a cut-off line in the light distribution pattern; and
   an optical grating unit disposed below the optical axis, and disposed between the rear focal point of said projector lens and said projector lens for reflecting at least a portion of the light that has passed the second focal point of said reflector and that has not passed through said light exit surface of said projector lens, wherein:
   said light exit surface has a front reflecting region that is disposed below and spaced apart from the optical axis;
   said vehicle lamp further comprises a front thin film disposed at said front reflecting region; and
   said front thin film is a coating, and is made of aluminum.

15. The vehicle lamp as claimed in claim 14, further comprising a high beam unit disposed below the optical axis and including a second light emitting element and a high beam reflector, such that light emitted from said second light emitting element is reflected by said high beam reflector to pass at least one of two focal points of said high beam reflector which are respectively proximate to said second light emitting element and the rear focal point of said projector lens.

* * * * *